(12) United States Patent
Anderson et al.

(10) Patent No.: US 8,253,802 B1
(45) Date of Patent: Aug. 28, 2012

(54) TECHNIQUE FOR IDENTIFYING, TRACING, OR TRACKING OBJECTS IN IMAGE DATA

(75) Inventors: Robert J. Anderson, Albuquerque, NM (US); Fredrick Rothganger, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 490 days.

(21) Appl. No.: 12/551,894

(22) Filed: Sep. 1, 2009

(51) Int. Cl.
*H04N 5/225* (2006.01)

(52) U.S. Cl. ........................................ 348/169; 382/103

(58) Field of Classification Search .................. 348/169; 382/103
See application file for complete search history.

(56) References Cited

U.S. PATENT DOCUMENTS

| | | | | |
|---|---|---|---|---|
| 5,999,651 A * | 12/1999 | Chang et al. | ........ | 382/215 |
| 6,259,802 B1 * | 7/2001 | Jolly et al. | ........ | 382/103 |
| 6,535,632 B1 * | 3/2003 | Park et al. | ........ | 382/164 |
| 6,654,497 B1 * | 11/2003 | Kondo et al. | ........ | 382/199 |
| 6,731,799 B1 * | 5/2004 | Sun et al. | ........ | 382/173 |
| 2002/0003900 A1 * | 1/2002 | Kondo | ........ | 382/199 |
| 2004/0101192 A1 * | 5/2004 | Yokoyama | ........ | 382/153 |
| 2006/0078163 A1 * | 4/2006 | Rui et al. | ........ | 382/103 |
| 2006/0285770 A1 * | 12/2006 | Lim et al. | ........ | 382/276 |
| 2007/0201749 A1 * | 8/2007 | Yamauchi et al. | ........ | 382/225 |
| 2010/0322472 A1 * | 12/2010 | Hamalainen | ........ | 382/103 |

OTHER PUBLICATIONS

Kang, Hyung W., "G-wire: A Livewire Segmentation Algorithm Based on a Generalized Graph Formulation", Pattern Recognition Letters, vol. 26, No. 13, 2005. 8 pages.
Smith, Christopher E. et al., "Efficient Polygonal Intersection Determination with Applications to Robotics and Vision", IEEE/RSJ International Conference on Intelligent Robots and Systems, Aug. 26, 2005, Edmonton, Alberta, Canada, 7 pages.

* cited by examiner

*Primary Examiner* — Abdullahi Salad
(74) *Attorney, Agent, or Firm* — Olivia J. Tsai

(57) ABSTRACT

A technique for computer vision uses a polygon contour to trace an object. The technique includes rendering a polygon contour superimposed over a first frame of image data. The polygon contour is iteratively refined to more accurately trace the object within the first frame after each iteration. The refinement includes computing image energies along lengths of contour lines of the polygon contour and adjusting positions of the contour lines based at least in part on the image energies.

24 Claims, 10 Drawing Sheets

TECHNIQUE FOR IDENTIFYING, TRACING, OR TRACKING OBJECTS IN IMAGE DATA

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to computer vision techniques, and in particular but not exclusively, relates to object identification, tracing, and tracking within image data.

BACKGROUND INFORMATION

Computer vision includes the science and engineering disciplines dedicated to the development of machines with vision. These machines receive image data (e.g., video sequence, views from multiple cameras, multi-dimensional data from 3D scanners, etc.) and analyze the image data to perform a variety of image related functions such as scene reconstruction, event detection, object identification, object tracking, learning, indexing, motion estimation, image restoration, etc.

Active contours, also referred to as pressure snakes, are used in computer vision to identify and delineate an object outline (e.g., trace the object). Pressure snakes trace an object by iteratively attempting to minimize an image energy associated with the contour as a sum of internal and external energies. FIG. 1 illustrates a conventional pressure snake or contour 100 that is attempting to trace a chevron object 101. The pressure snake algorithm operates by computing image energy 105 and curvature energy 110. The pressure snake algorithm generates an energy function associated with contour 100 and attempts to minimize the image energy by aligning contour 100 with the boundaries of object 101. Image energy is calculated for each node 115 along contour 100 by evaluating only pixel energies in a small neighborhood 120 localized around each node 115. Image energy 105 pushes contour 100 outward while curvature energy 110 pulls nodes inward along the line axes. Nodes 115 are added when a line segment is too long and deleted when a line segment is too short. The pressure snake algorithm inherently rounds corners, since the algorithm includes no mechanism for attracting nodes 105 to the corners of object 101.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method capable of identifying, tracing, and tracking an object within an image sequence are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
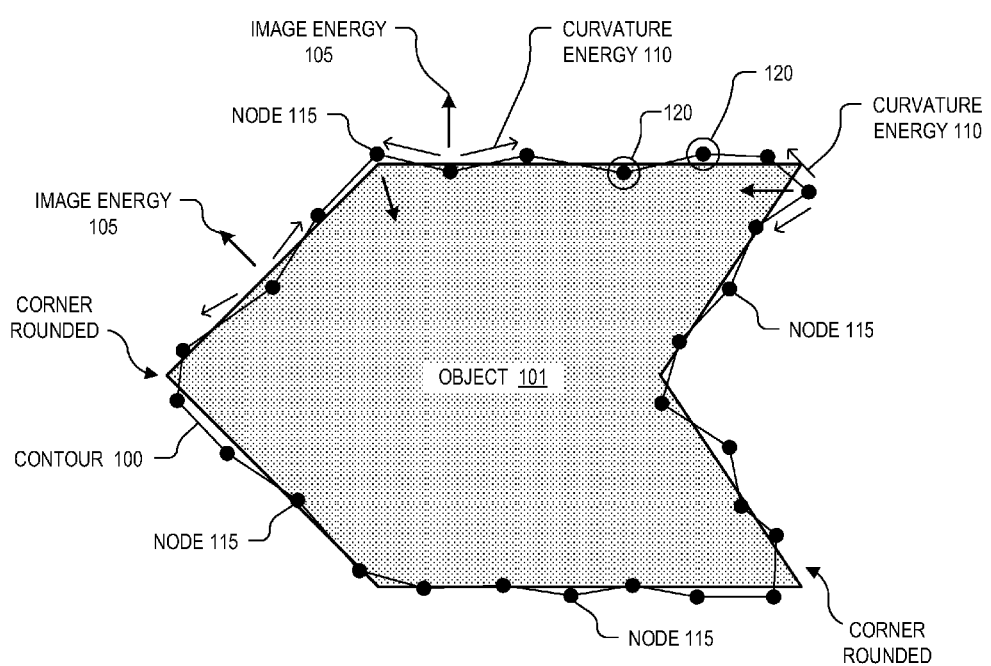
FIG. 1 (PRIOR ART) illustrates a conventional technique for tracing an object using active contours.
Figure 2:
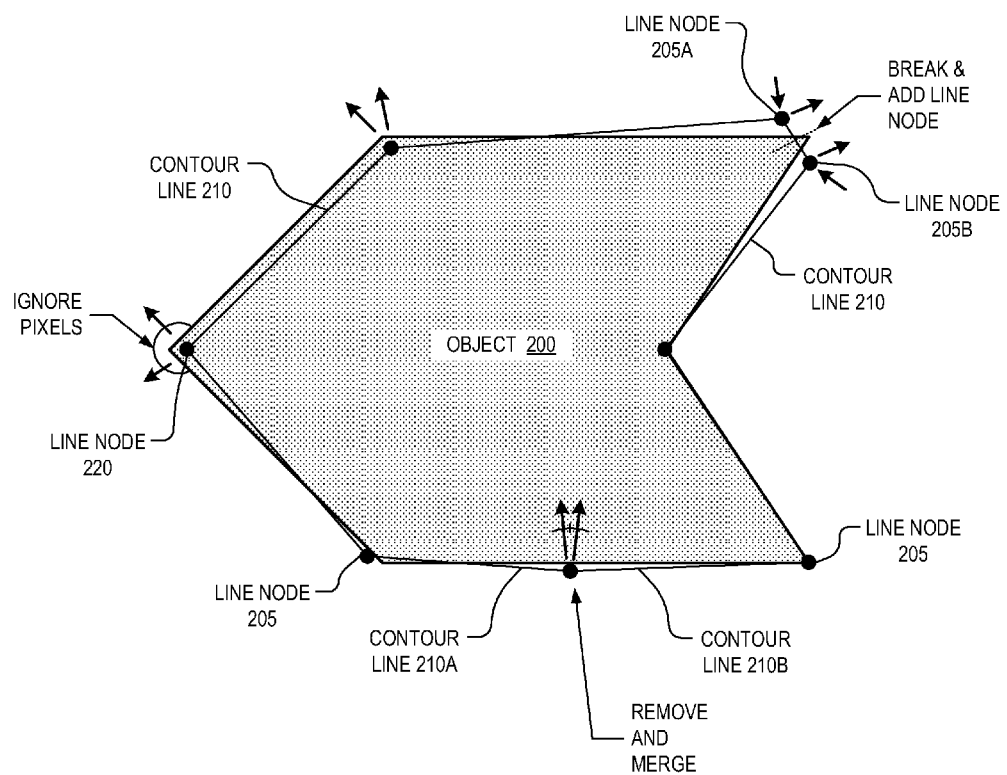
FIG. 2 illustrates a technique for tracing an object using a polygon snake algorithm, in accordance with an embodiment of the invention.

FIG. 2 illustrates a technique for tracing an object 200 using a polygon snake algorithm, in accordance with an embodiment of the invention. The polygon snake algorithm uses a polygon contour (also referred to as a polygon snake) to trace or delineate an outline of object 200. The polygon snake algorithm is an iterative algorithm that refines the polygon contour to more closely trace object 200 after each iteration. The polygon contour is made up of a series line nodes 205 (only a portion are labeled) interconnected by contour lines 210 (only a portion are labeled) that form a closed polygon shape. The polygon snake algorithm refines the polygon contour by moving the positions of line nodes 205 and contour lines 210 and inserting or removing line nodes 205 and contour lines 210, until the polygon contour traces object 200 within defined thresholds.

The polygon snake algorithms computes image energies along the length of each contour line 210 to determine how the contour line should be refined—as opposed to prior art techniques that compute image energies about line nodes. The polygon snake algorithm attempts to minimize the image energy associated with each contour line 210 by refining the position of each contour line 210. Inherent in the polygon snake algorithm, line nodes 205 are attracted to geometric corners or points on the boundary of the objects being traced and contour lines 210 can theoretically achieve "zero" image energy states resulting in reduced line jitter and increased image stability of the polygon contour.

Figure 3:
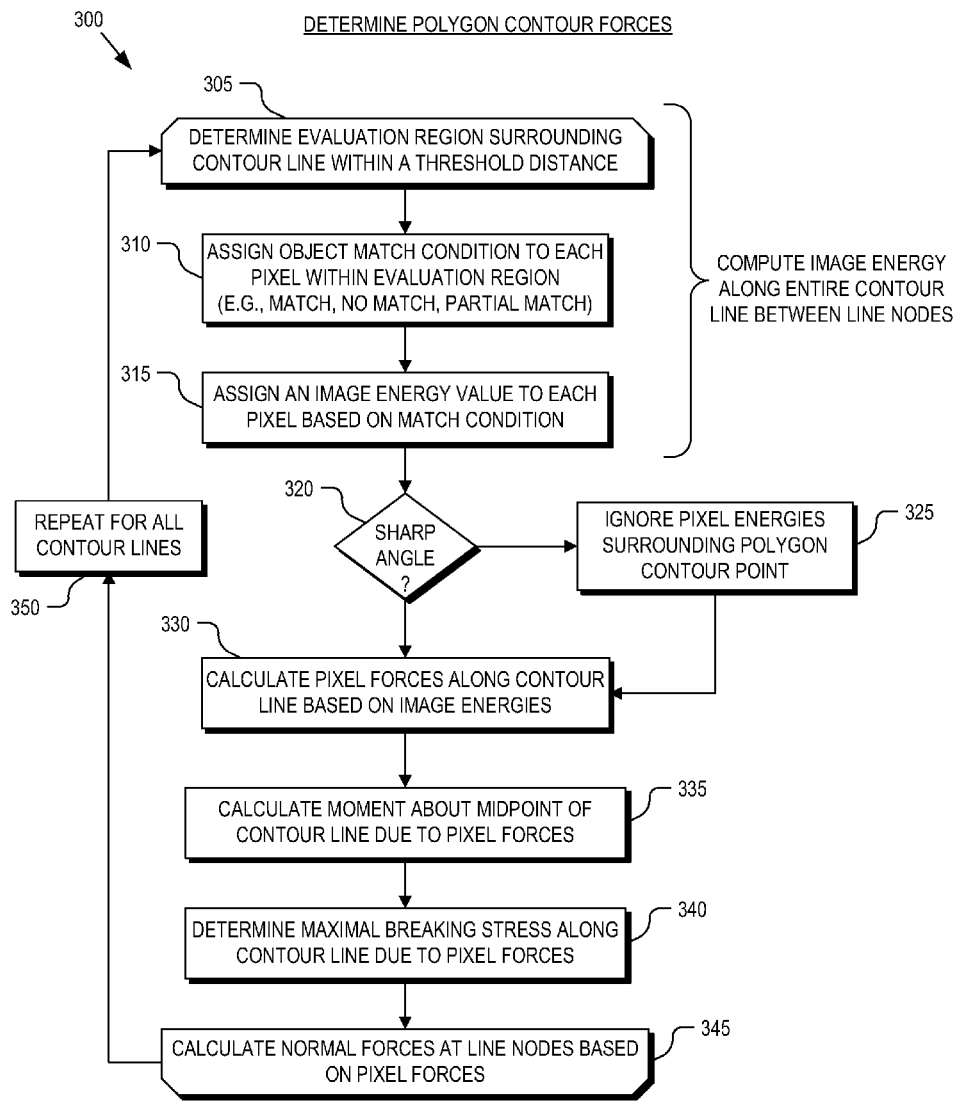
FIG. 3 is a flow chart illustrating a process for calculating image energy forces on a single contour line of a polygon contour, in accordance with an embodiment of the invention.
Figure 4:
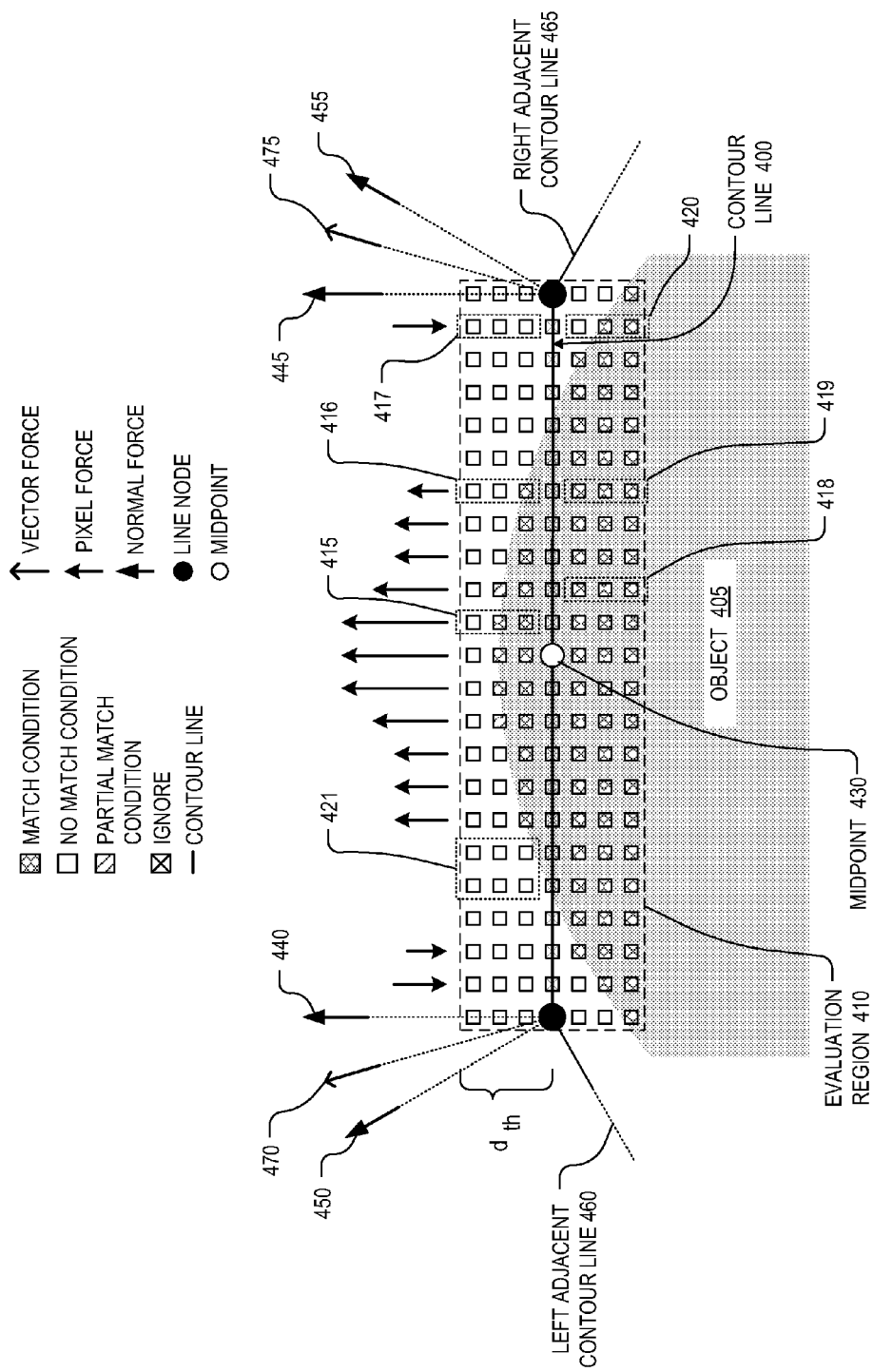
FIG. 4 illustrates the calculation of image energy forces along a single contour line of a polygon contour, in accordance with an embodiment of the invention.

FIG. 3 is a flow chart illustrating a process 300 for calculating image energy forces on a single contour line of a polygon contour, in accordance with an embodiment of the invention. Process 300 is described with reference to the example of FIG. 4. FIG. 4 illustrates the calculation of image energy forces along a single contour line 400 of a polygon contour wrapping or tracing an object 405; however, it should be appreciated that FIG. 4 only illustrates an intermediate refinement state—not a final or zero energy state. Furthermore, process 300 is repeated on each contour line within a polygon contour for each iteration of refinement. Contour line 400 in FIG. 4 is referenced as an example, but it should be appreciated that process 300 would be repeated on each contour line within the polygon contour tracing object 405. The order in which some or all of the process blocks appear in process 300 should not be deemed limiting. Rather, one of ordinary skill in the art having the benefit of the present disclosure will understand that some of the process blocks may be executed in a variety of orders not illustrated.

As mentioned above, the polygon snake algorithm determines image energies along the entire length of each contour line of a polygon contour. In a process block 405, an evaluation region 410 surrounding contour line 400 is determined. Evaluation region may be determined by evaluating pixels on either side of contour line 400 up to a threshold distance $d_{th}$ away from contour line 400. For example, the threshold distance $d_{th}$ may be equal to three pixels. Those pixels falling on contour line 400 itself may be ignored as not clearly on the inside or outside of the polygon contour. Note, FIG. 4 illustrates an ideal situation where contour line 400 resides over a perfect horizontal row of pixels. However, in practice contour line 400 is more likely to cut diagonally through a pixel grid. In one embodiment, Breshenham's algorithm is used to sequence contour line 400 to determine which pixels fall on contour line 400.

In a process block 310, an object match condition is assigned to each pixel within evaluation region 410. The object match condition may be determined based on a selected characteristic of object 405. For example, object 405 may be considered to be a contiguous group of pixels all having the same color (within an color range), the same intensity (within an intensity range), the same luminance (within a luminance range), the same grey scale value (within a grey scale range), or otherwise. Other image characteristics may be used to define whether or not a pixel is part of an object, such as, converting an RGB color space to an alpha or attenuation space, to an LUV color space, or to a palette table. In an embodiment where the image frame or image sequence is converted to a palette table of a defined number of colors (e.g., 256 colors), then object 405 may be represented as a collection of contiguous pixels all having the same palette color or a specified subset of the palette colors.

In one embodiment, three object match conditions are used "match," "no match," or "partial match." In one embodiment, the object match condition is biased to group most pixels into either the "match" or "no match" categories, with few pixels being assigned to the "partial match" category. The "match," "no match," and "partial match" conditions are illustrated in FIG. 4 with pixel shading. The ignored pixels falling on contour line 400 are illustrated with an "X."

In a process block 315, an image energy value is assigned to each pixel based on its associated object match condition. For example, "matching" pixels evaluate to zero inside the polygon contour and to one outside the polygon contour Likewise, "non-matching" pixels evaluate to zero outside the polygon contour and to one inside the polygon contour. "Partial matching" pixels map to a value between zero and one (unity). In one embodiment, this is implemented as a saturation function with most of the color space mapping into either zero or unity. In one embodiment, the image frame is decomposed into an LUV (L—luminance, UV—chrominance) color space and each pixel assigned a value depending upon whether the given pixel is within a target color range and whether the given pixel is inside or outside the current boundary delineated by the polygon contour.

In the illustrated embodiment of FIG. 3, those pixels immediately surrounding a sharp angle of the polygon contour are ignored in a similar manner to those pixels residing on contour line 400. These pixels are ignored cause they tend to reduce the accuracy of the trace. For example, referring to FIG. 2 those pixels within the circle about line node 220 may be ignored (in direct contrast to prior art techniques which only consider pixels about line nodes). Returning to FIG. 3, if the current contour line being evaluated forms a sharp angle with an adjacent contour line (decision block 320), then the pixel energies localized about the line node (e.g., line node 220) between these adjacent contour lines are ignored (or equivalently not calculated).

In a process block 330, pixel forces are calculated along the length of contour line 400. These pixel forces are calculated based upon the pixel energies assigned in process block 315. For example, the pixels may be grouped (e.g., pixel groups 415-420). Since pixel group 415 includes two "match" condition pixels external to the polygon contour it computes to a larger outward pushing pixel force than pixel group 416, which only includes one external pixel having a "match" condition. Similarly, pixel group 420 residing within the polygon contour includes one pixel having a "no match" condition and therefore computes to a small inward pulling pixel force. It is noteworthy that pixel groups 417, 418, and 419 contribute zero image energy and therefore compute to a zero pixel force. In the illustrated embodiment, the pixel groups each include those pixels falling on the same side of contour line 400 residing substantially in a line normal to contour line 400. In other embodiments, each pixel group may include multiple columns of adjacent pixels (e.g., pixel group 421) all of which pixels would be considered for computing a single pixel force for the entire group.

In a process block 335, the pixel forces acting along contour line 400 are used to calculate a moment of force or "moment" about midpoint 430. Although the illustrated embodiment places midpoint in the center of contour line 400, other embodiments may calculated the moment about any point along contour line 400. In one embodiment, the moment is calculated by multiplying each pixel force along contour line 400 by its moment arm as measured from midpoint 430 and then summing the moments along contour line 400.

In a process block 340, the maximal breaking stress along contour line 400 due to the pixel forces is identified. For example, in FIG. 4 the pixel forces on either end of contour line 400 are applying inward pressure while the pixel forces about midpoint 430 are applying outward pressure. As such, the maximal breaking stress along the length of contour line 400 will occur in the center of contour line 400 near midpoint 430.

In a process block 345, pixel forces along contour line 400 and the total moment from all the pixel forces are summed and represented as two normal forces 440 and 445, each acting on a separate line node at either end of contour line 400. In one embodiment, the normal forces are normal to contour line 400, as illustrated in FIG. 4. As mentioned above, process 300 is repeated for each contour line (process block 350) within the polygon contour to calculate the normal forces associated with each contour line.

Figure 5:
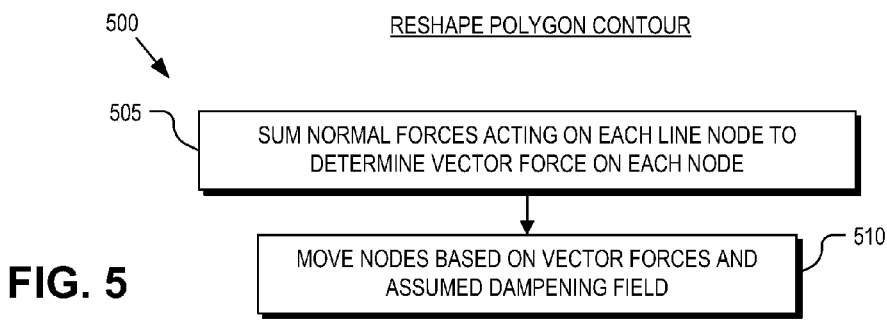
FIG. 5 is a flow chart illustrating a process for reshaping a polygon contour, in accordance with an embodiment of the invention.

FIG. 5 is a flow chart illustrating a process 500 for reshaping a polygon contour, in accordance with an embodiment of the invention. Process 500 may be executed in parallel with process 300 or after process 300 has been repeated for all contour lines within a given polygon contour to calculate the normal forces associated with all contour lines of the given polygon contour.

Once the normal forces 440 and 445 for contour line 400, as well as, the normal forces 450 and 455 for left adjacent contour line 460 and right adjacent contour line 465, respectively, have been computed, the normal forces acting on each line node can be summed as vector forces 470 and 475, respectively (process block 505). In other words, the two normal forces acting on a given line node due to its adjacent contour lines are summed into a single vector force. Process block 505 is repeated for all line nodes within the polygon contour. Finally, in a process block 510, the line nodes are all moved based on their respective vector force and an assumed dampening field. In one embodiment, the movement of a pair of line nodes and their associated contour line is clamped by $d_{th}$ or the size of evaluation region 410. Clamping the movement prevents a given contour line from moving past pixels that were not evaluated during a given iteration. Process 500 is repeated for each iteration of the polygon snake algorithm, after new normal forces for the current iteration have been calculated in process 300.

In one embodiment, as the polygon contour expands to include new pixels within its contour, these pixels are flagged or otherwise marked as "taken" and remain "taken" for as long as they remain on the interior of the polygon contour. A pixel can only be marked as "taken" by a single polygon contour at a time. Once a pixel is taken by a given polygon contour, that pixel will evaluate as a "no match condition" for all other polygon contours within the same image frame, regardless of whether the pixel would otherwise evaluate as a "match condition." In this manner, multiple polygon contours are prevented from tracing the same object or blob within a given image frame.

Figure 6:
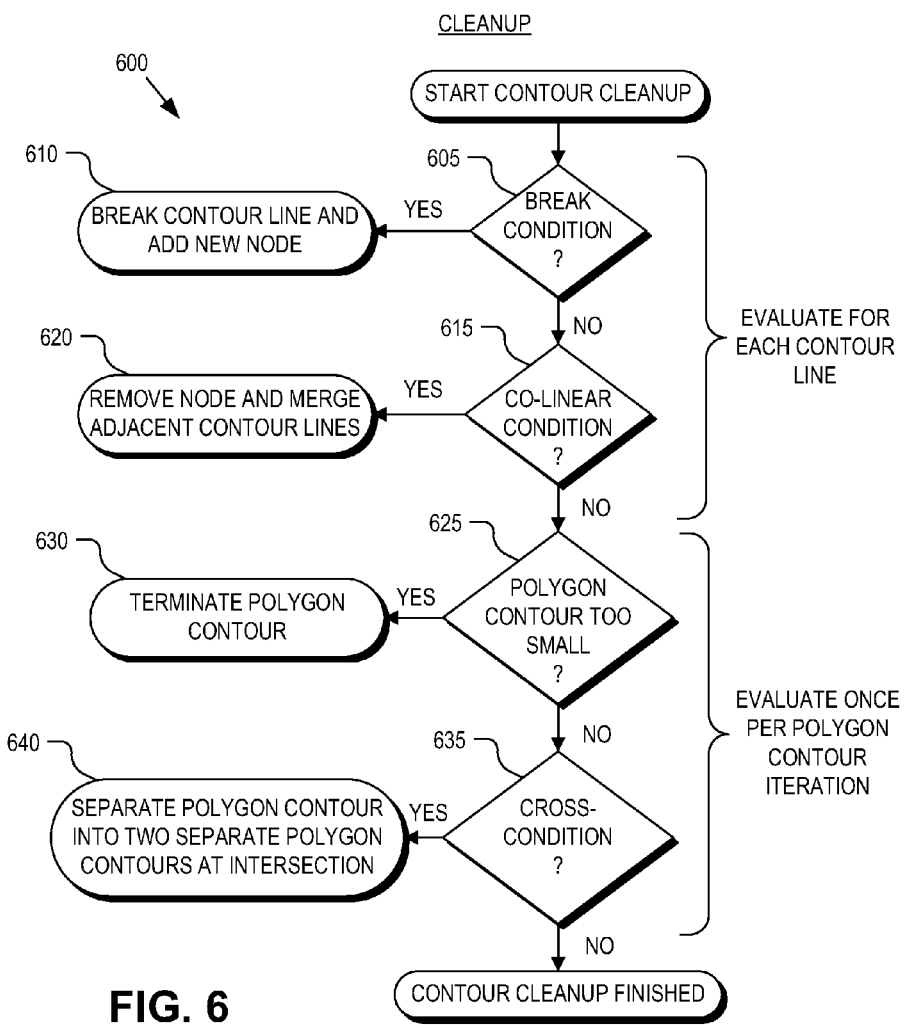
FIG. 6 is a flow chart illustrating a process for cleaning up a polygon contour during refinement of the polygon contour to trace an object in an image frame, in accordance with an embodiment of the invention.

FIG. 6 is a flow chart illustrating a process 600 for cleaning up a polygon contour during refinement of the polygon contour to trace an object in an image frame, in accordance with an embodiment of the invention. Process 600 may be executed in parallel with processes 300 and/or 500 or after processes 300 and/or 500 have completed for a given iteration. The order in which some or all of the process blocks appear in process 600 should not be deemed limiting. Rather, one of ordinary skill in the art having the benefit of the present disclosure will understand that some of the process blocks may be executed in a variety of orders not illustrated.

In a decision block 605, contour line 400 is analyzed to determine whether a break condition has occurred. A break condition occurs when the maximal breaking stress identified in process block 340 (see FIG. 3) is greater than a threshold breaking stress. If the break condition is affirmative, then contour line 400 is split into two separate contour lines and a new line node inserted between the split contour lines (process block 610). Referring to object 200 illustrated in FIG. 2, a break condition may occur between line nodes 205A and 205B. Since points, angles, or vertices on the boundary of an object are natural locations to cause break conditions, line nodes are attracted to these boundary features as an inherent feature of the polygon snake algorithm.

In a decision block 615, adjacent contour lines are analyzed to determine whether a co-linear condition has occurred. A co-linear condition occurs when the angle between the normals of two adjacent contour lines drops below a threshold value. If a co-linear condition is affirmative, then the two adjacent contour lines are merged into a single contour line by removing the line node between the two contour lines (process block 620). This may also be referred to as line culling or contour line culling. Referring to the example of FIG. 2, contour lines 210A and 210B may be deemed to be co-linear. In one embodiment, after a break condition has occurred, the newly created contour line is exempt from the co-linear condition for a number of refinement iterations thereafter, since it may initially be substantially co-linear with its neighboring contour line from which it broke.

After each refinement iteration of a polygon contour, the polygon contour is analyzed to determine whether it is too small (decision block 625). In one embodiment, the size of a polygon contour is calculated based on a sum total length of all its constituent contour lines. In other embodiments, interior area of the polygon contour may be calculated instead of or in addition to the total length. If a polygon contour is deemed to drop below a threshold size, then the polygon contour is terminated and deleted (process block 630). This may be referred to as polygon contour culling and is used as a way to terminate polygon contours that are encircling specks, transients, or other noise in an image frame.

After each refinement iteration of a polygon contour, the polygon contour is analyzed to determine whether two constituent contour lines of the same polygon contour have crossed paths (decision block 635). If two contour lines cross paths, the polygon contour is separated into two separate polygon contours at the intersection by inserting two line nodes at the intersection point, one for each polygon contour and allowing the nodes to migrate apart.

Figure 7:
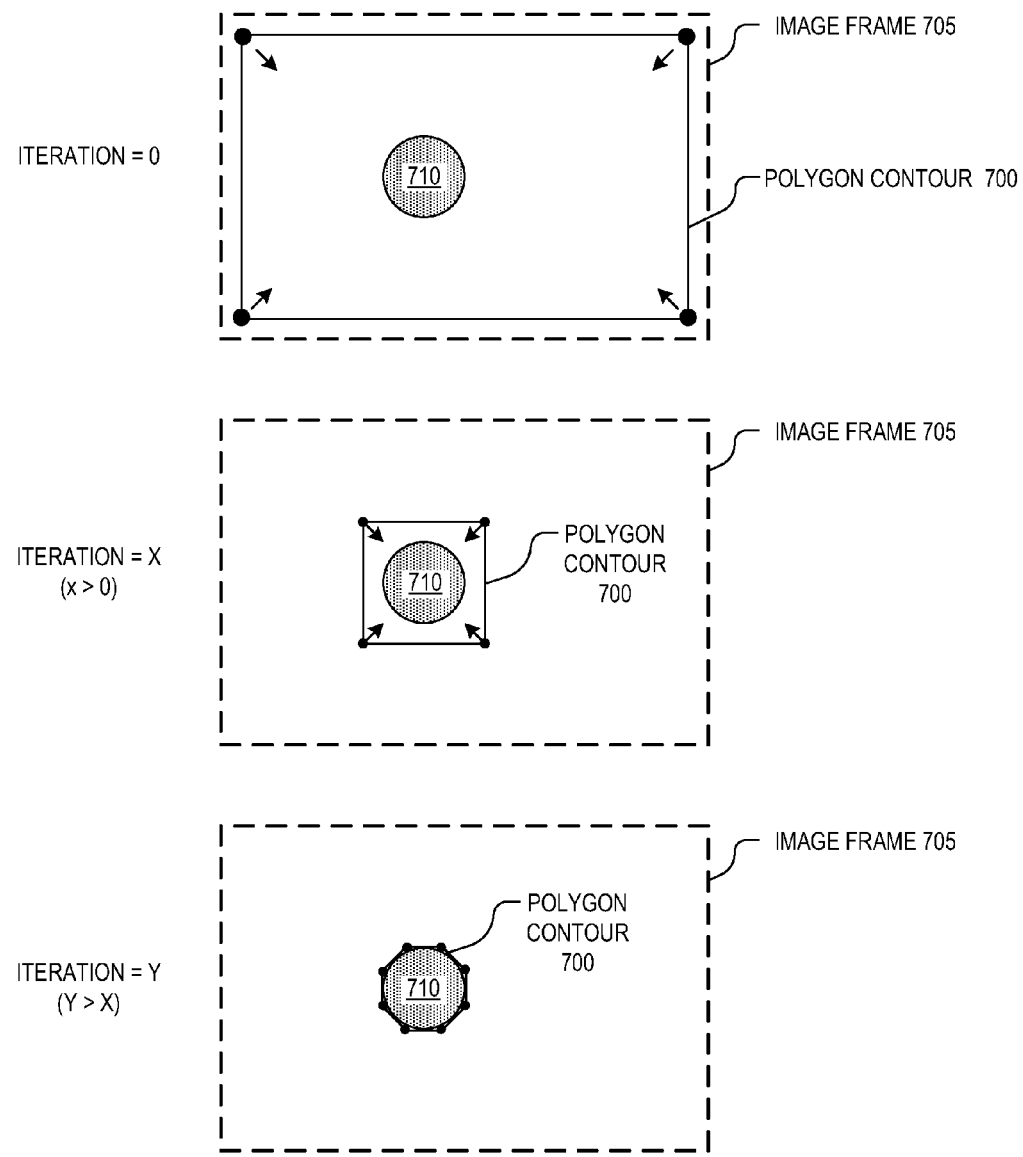
FIG. 7 illustrates a region wrapping technique for seeding the polygon snake algorithm, in accordance with an embodiment of the invention.
Figure 8:
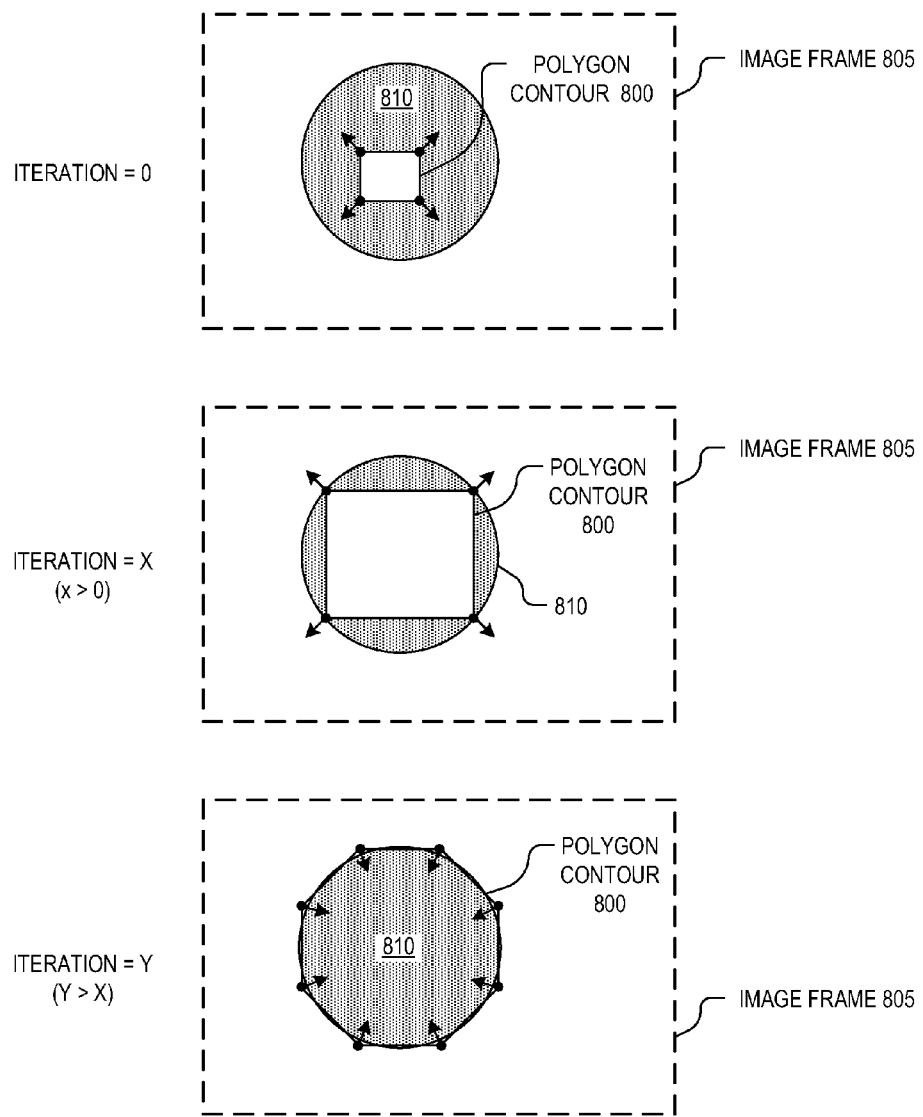
FIG. 8 illustrates a blob detection technique for seeding the polygon snake algorithm, in accordance with an embodiment of the invention.
Figure 9:
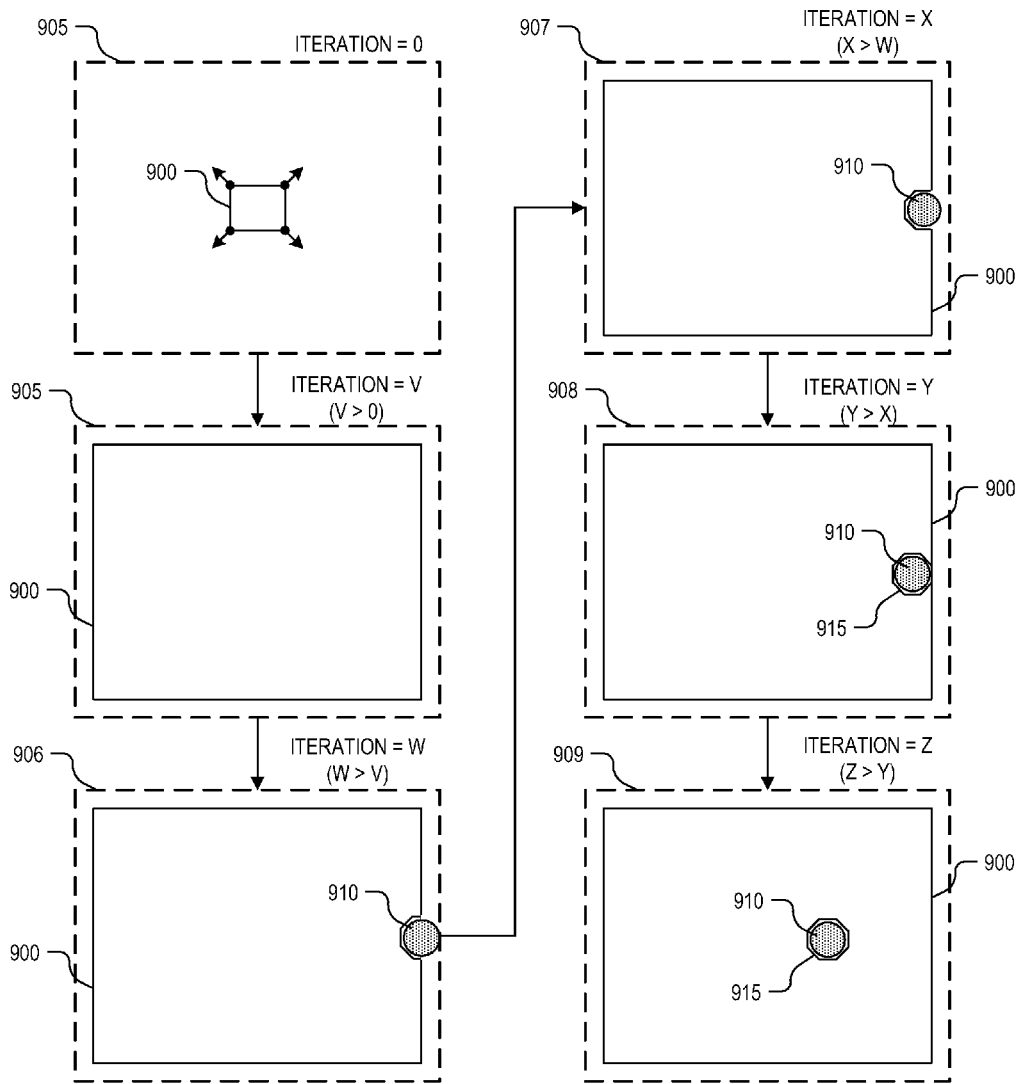
FIG. 9 illustrates a boundary monitoring technique for seeding the polygon snake algorithm, in accordance with an embodiment of the invention.

FIGS. 7-9 illustrate three different seeding techniques for starting or creating a new polygon contour within an image frame or sequence of image frames, in accordance with embodiments of the invention. FIG. 7 illustrates a region wrapping technique for seeding the polygon snake algorithm. FIG. 7 illustrates a polygon contour 700 after three separate refinement iterations 0, X, and Y of the polygon snake algorithm (note, the three illustrated refinement iterations are not necessary consecutive iterations). Initially (iteration 0), polygon contour 700 is drawn to wrap the entire image frame 705 to search for any object within its bounds that matches the object characteristic for which it is searching (e.g., specific color range, intensity range, alpha range, color palette group, etc.).

If object 710 is determined to include the characteristic for which polygon contour 700 is searching, the polygon snake algorithm will commence refining polygon contour 700 with each iteration to more accurately trace object 710. As illustrated, after iteration X, polygon contour 700 has shrunk about object 710. By iteration Y, the polygon snake algorithm has encountered a number of break conditions resulting in the creation of more contour lines and polygon contour 700 more accurately traces object 710.

FIG. 8 illustrates a blob detection technique for seeding the polygon snake algorithm. FIG. 8 illustrates a polygon contour 800 after three separate refinement iterations 0, X, and Y of the polygon snake algorithm (note, the three illustrated refinement iterations are not necessary consecutive iterations). Initially (iteration 0), a default polygon contour 800 is drawn within an object 810 having a matching object characteristic. The polygon contour 800 may manually be placed within object 810 by clicking on object 810 or automatically be drawn within object 810 in response to an auto detect routine that search image frame 805 for a contiguous block of pixels of a minimum number all sharing the matching object characteristic.

Once the default or initial polygon contour 800 is created (iteration 0), the polygon snake algorithm commences refining polygon contour 800 with each iteration to more accurately trace object 810. As illustrated, after iteration X, polygon contour 700 has expanded. By iteration Y, the polygon snake algorithm has encountered a number of break conditions resulting in the creation of more contour lines and polygon contour 800 more accurately traces object 810.

FIG. 9 illustrates a boundary monitoring technique for seeding the polygon snake algorithm. FIG. 9 illustrates a polygon contour 900 after six separate refinement iterations 0, V, W, X, Y, and Z of the polygon snake algorithm. The six illustrated refinement iterations are not necessary consecutive iterations, and furthermore, iterations 0 and V may occur on the same image frame 905, while iterations W, X, Y, and Z may occur on separate image frames 906, 907, 908, and 909, respectively, occurring within a sequence of image frames.

Initially (iteration 0), a default polygon contour 900 is drawn within image frame 905. Once created, polygon contour 900 expands outward searching for an object within image frame 905 matching the selected object characteristic. If such an object is found, then polygon contour 900 would wrap (e.g., trace) the object, create a child polygon contour that separates from polygon contour 900 to trace and track the object, while polygon contour 900 continues to expand outward. After some number of subsequent iterations (iteration V), polygon contour 900 reaches the boundaries of image frame 905. If image frame 905 is just one image frame in a sequence of image frames (e.g., video sequence), then polygon contour 900 will remain at the boundary of image frame 905 and the subsequent image frames waiting for a matching object to cross it contour (e.g., enter the frame or any subsequent frame).

In iteration W, a match object 910 eventually begins to enter image frame 906 from the right side. At this point, polygon contour 900 commences tracing the boundary of object 910 as it enters the screen or frame. In one embodiment, polygon contour 900 may be thought of as a contour that traces everything except objects that match the characteristic for which it is searching. In other words, polygon contour 900 may be thought of as a reverse polygon contour.

After iteration X, object 910 continues to enter further into image frame 907 and polygon contour 900 continues to be updated using the polygon snake algorithm discussed above to trace out the boundary of object 910. By iteration Y, object 910 has fully enter image frame 908 resulting in a cross-condition (e.g., as discussed in connection with decision block 635 in FIG. 6). At this point, a regular wrapping polygon contour 915 separates off from the reverse polygon contour 900 at the intersection point. After iteration Z, the wrapping polygon contour 915 has continued to follow object 910 towards the center of image frame 909, while the reverse polygon contour 900 continues to monitor the boundary of image frame 909 for additional matching objects that may enter the screen (e.g., image frame 909 or any subsequent image frames within the video sequence).

Figure 10:
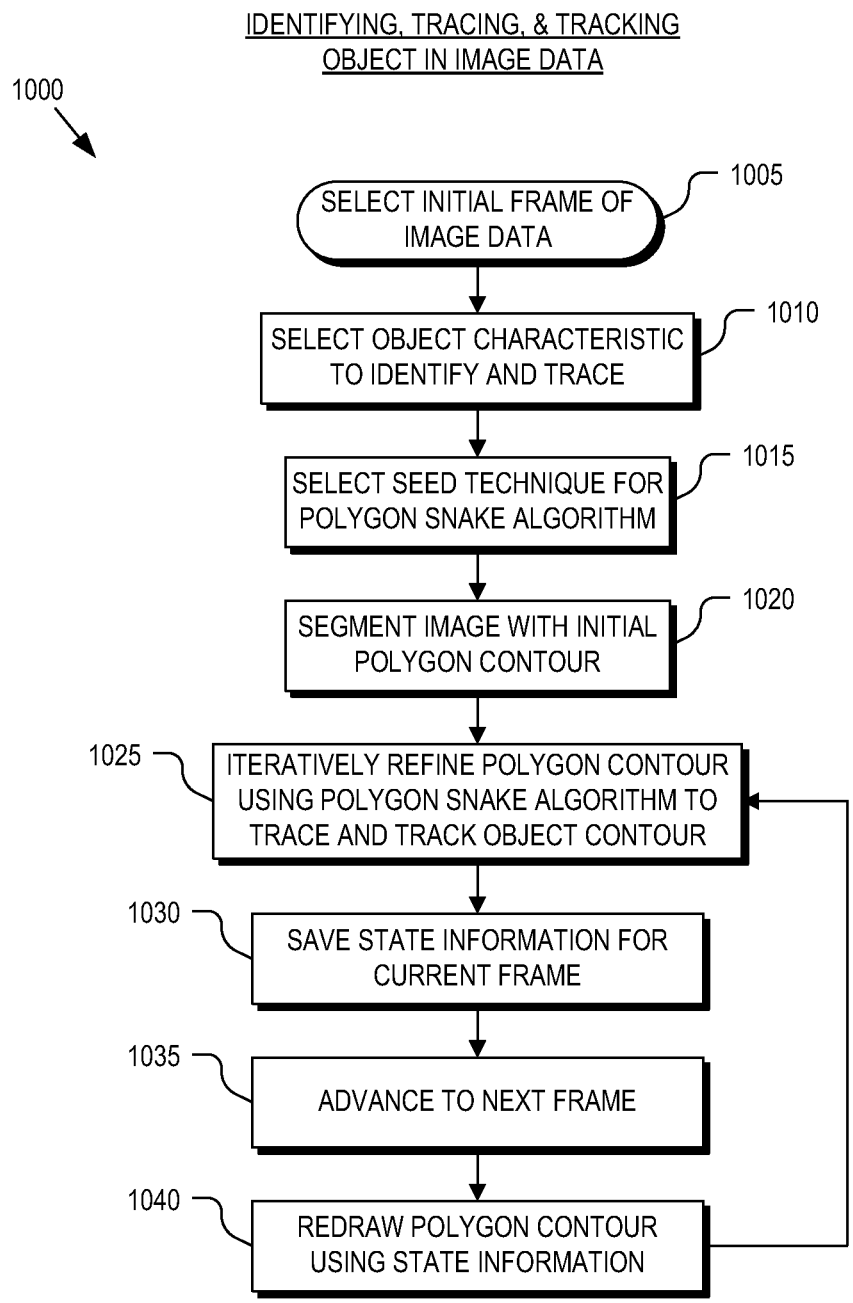
FIG. 10 is a flow chart illustrating a process for identifying, tracing, and tracking an object within a image sequence using the polygon snake algorithm, in accordance with an embodiment of the invention.

FIG. 10 is a flow chart illustrating a process 1000 for identifying, tracing, and tracking an object within a image sequence using the polygon snake algorithm, in accordance with an embodiment of the invention. The order in which some or all of the process blocks appear in process 1000 should not be deemed limiting. Rather, one of ordinary skill in the art having the benefit of the present disclosure will understand that some of the process blocks may be executed in a variety of orders not illustrated.

In a process block 1005, the initial frame of image data is selected. The image data (e.g., image sequence) may include a variety of different types, including: video sequences; 3D image sequences; medical image data such as CT scans, PET scans, MRI scans; X-ray image sequences; infrared image sequences. The initial frame may be any arbitrary image frame within the image dataset.

In a process block 1010, an object characteristic to search for is selected. As previously mentioned, the object characteristic may include a variety of characteristics such as a luminance range, a color range, an alpha range, an intensity range, a subset of a color palette, or otherwise.

In a process block 1015, a seeding technique for initiating the polygon snake algorithm is selected. The seeding technique may be selected from any of the techniques described above in connection with FIGS. 7-9. In a process block 1020, the initial image frame is segmented by an initial or default polygon contour. The polygon snake algorithm iteratively refines the polygon contour from its initial or default size, shape, and position within the initial image frame to more closely trace a selected object. In one embodiment, the polygon snake algorithm is iterated a set number of times per frame (e.g., 10 times). In an example where the polygon snake algorithm is iterated 10 times per frame on image data having 30 frames per second, the polygon snake algorithm would be iterated at a rate of 300 times per second. Of course, other iteration rates may be implemented based on the frame rate, available processing power, and expected object motion speed within the image data.

The polygon snake algorithm can be used to not only identify and trace an object in a static image frame, but also track the object in motion from one image frame to the next. As the object moves from one frame to the next, its boundary will move between the image frames causing the polygon contour tracing the object to be updated and move along with the object.

In a process block 1030, state information associated with the position of the polygon contour (e.g., length, orientation, and position of the contour lines or position of the line nodes) is saved prior to advancing to a next image frame in the sequence of image frames (process block 1035). In one embodiment, the state information is updated every iteration through the polygon snake algorithm. In another embodiment, the state information is updated just prior to advancing to a next image frame. In this manner, the polygon contour is redrawn in the next image frame based upon its last position in the previous image frame (process block 1040).

The polygon snake algorithm may be used to implement an efficient, robust object tracking and identification technique. By using simple colored polygon markings on objects, objects can be identified and tracked. Many manmade objects often already have polygonal shapes. The polygon snake algorithm is robust to pixel noise. Small lines, scratches, etc., typical don't significantly impact the algorithm, since pixels are summed over entire line segments (contour lines) to determine contour line movement. Because the snake algorithm computes data within a few pixels of the target polygon contour, it is fast. The image energy computation is proportional to the polygon contour perimeter distance, rather then the polygon area or total image area. If the image evaluation function is highly thresholded, much of the computation is binary, either incrementing a buffer by one or not. Multiple polygon snakes searching for different colors can all run simultaneously on the same image dataset. By segmenting an image frame into a set of different, complementary and complete color match regions, a live image can be completely subdivided into polygon contours, resulting into a "paint-by-numbers" equivalent digitized image. Pixel corners on polygons make strong features for identification and tracking of 3D objects. Although the angles of polygons vary under perspective transformations, their line segments remain straight, and the convexity or concavity condition of each node is maintained. Objects such as arrows, chevrons, etc. with unique patterns of convex and concave nodes can be readily identified with this algorithm and mapped to 3-D objects. The polygon snake algorithm is distinct from existing statistical pressure snake and active contour approaches. Whereas existing approaches compute the forces on the line nodes, and balance internal contour energy with image energy, the polygon snake algorithm uses image energy generated from matches and non-matches on both sides of each contour line. Line nodes are moved by computing the line-energy sums, and don't require any internal energy to generate their 2-D motion in the image plane. Culling conditions keep the number of feature points down.

Embodiments of the polygon snake algorithm have been described above in a two dimensional ("2D") context. However, the polygon snake algorithm described herein can be extended to the 3D context by replacing or equating pixels with voxels, contour lines with contour planes, polygon contours with polyhedron contours, 2D objects with 3D objects, 2D vector forces with 3D vector forces, 2D video sequences with 3D image sequences, etc.

Figure 11:
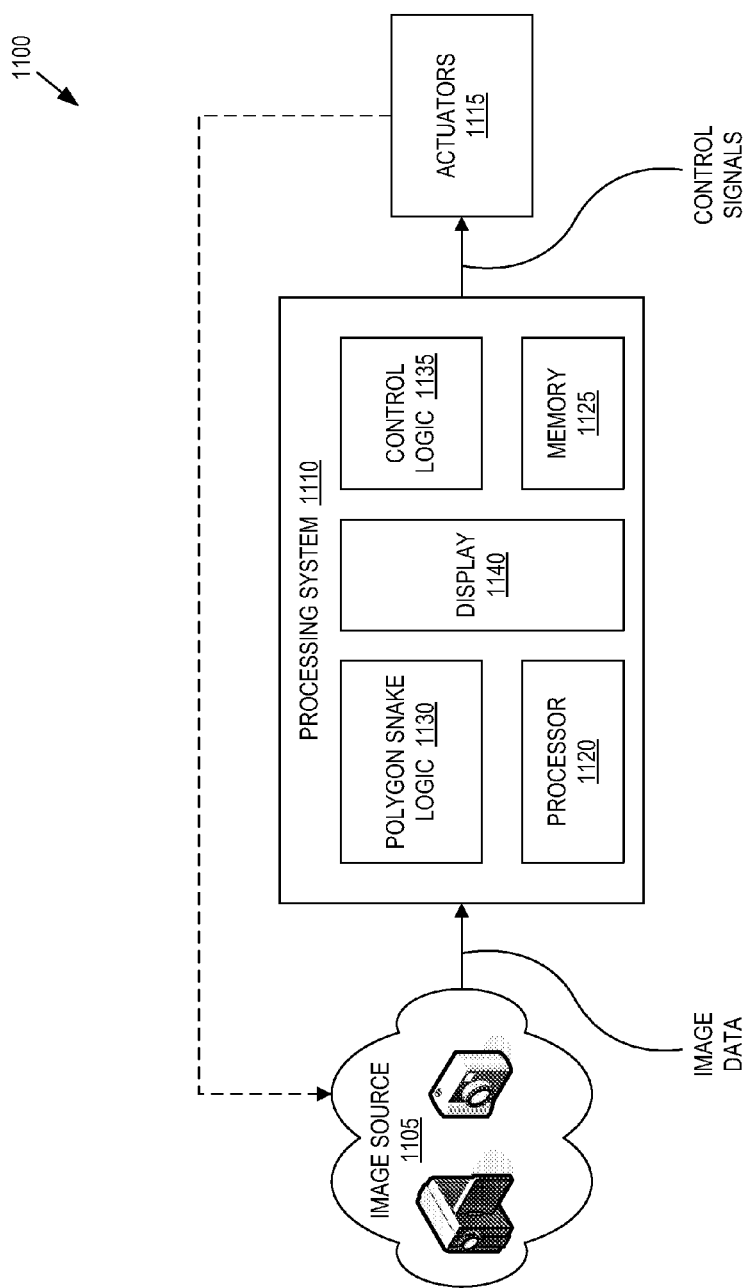
FIG. 11 illustrates a demonstrative computer vision system in which embodiments of the invention may be implemented.

FIG. 11 illustrates a demonstrative computer vision system 1100 in which embodiments of the invention may be implemented. The illustrated embodiment of computer vision system 1100 includes an image source 1105, a processing system 1110, and actuators 1115. The illustrated embodiment of processing system 1110 includes a processor 1120, memory 1125, polygon snake logic 1130, control logic 1135, and a display 1140. Computer vision system 1100 may represent a variety of computer vision applications including robotics, surveillance, image editing, or otherwise. In some applications, only a portion of the illustrated components are present and/or necessary to implement the given application.

In one embodiment, processing system 1110 is coupled to receive image data from image source 1105. The connection may include the transfer of pre-recorded image data or a real-time image feed. The image data may be processed directly, temporarily buffered within memory 1125, or bulk transferred into memory 1125 for later processing. Polygon snake logic 1130 represent the logic for implementing any of processes 300, 500, 600, or 1000. In one embodiment, polygon snake logic 1130 is embodied as software/firmware logic stored within memory 1125 for execution by processor 1120. In one embodiment, polygon snake logic 1130 is embodied within hardware logic (e.g., application specific integrated circuit, field programmable gate array, etc.). During execution, the image data may be rendered to display 1140 with the polygon contours superimposed over the image data and tracing the boundaries of select object(s) within the image data.

In some embodiments, the polygon contours may be used to track object(s) within the image data. In the case of real-time image feeds, the polygon contours may provide input data into control logic 1135. In response, control logic 1135 may output control signals for controlling actuator(s) 1115. For example, actuator(s) 1115 may be used to used to select the pan or tilt position of a surveillance camera or feedback motion control of a robot. For example, if the image data is sourced from a moveable camera, a boundary monitor snake can be established at the boundary of the image frame, and any objects that come into the field of view by panning or tilting the camera will automatically be wrapped. Of course, the polygon snake algorithm described above may be implemented within a variety of other computing and control system contexts.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (i.e., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.). However, a computer-readable storage medium is not merely a signal.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method for computer vision, the method comprising:
    rendering a polygon contour superimposed over a first frame of image data; and
    iteratively refining the polygon contour to more accurately trace an object within the first frame after each iteration, wherein the refining includes:
        computing image energies along lengths of contour lines of the polygon contour;
        adjusting positions of the contour lines based at least in part on the image energies;
        determining a maximal breaking stress asserted on a given contour line;
        determining whether the maximal breaking stress exceeds a breaking threshold; and
        if the maximal breaking stress exceed the breaking threshold, then breaking the given contour line into two contour lines.

2. The computer implemented method of claim 1, wherein computing the image energies along the lengths of the contour lines for a given contour line comprises:
    determining an evaluation region localized around the given contour line;
    assigning an object match condition to each pixel within the evaluation region; and assigning image energy values to the pixels within the evaluation region based on the object match condition assigned to each of the pixels.

3. The computer implemented method of claim 2, wherein determining the evaluation region localized around the given contour line includes ignoring pixels surrounding a point on the polygon contour formed by adjacent contour lines intersecting at an angle less than a predefined angle.

4. The computer implemented method of claim 2, wherein adjusting the positions of the contour lines for the given contour line comprises:
    calculating pixel forces along the given contour line based on the energy values;
    calculating a moment on the given contour line due to the pixel forces; and
    calculating first and second forces acting on first and second ends of the given contour line, respectively, the first and second forces being equivalent to a sum of the pixel forces and the moment acting on the given contour line.

5. The computer implemented method of claim 4, wherein the first and second forces comprise normal forces acting normal to the given contour line.

6. The computer implemented method of claim 4, wherein adjusting the positions of the contour lines for the given contour line further comprises:
    summing normal forces acting on a given line node from adjacent contour lines to determine a vector force for the given line node; and
    moving the given line node based at least in part on the vector force.

7. The computer implemented method of claim 6, wherein moving the given line node based at least in part on the vector force further comprises moving the given line node based at least in part on the vector force and an assumed dampening field, wherein the movement is clamped by a dimension of the evaluation region.

8. The computer implemented method of claim 1, wherein the refining further includes:
    determining whether two adjacent contour lines are sufficiently co-linear within a threshold angle; and
    if the two adjacent contour lines are sufficiently co-linear, then removing a line node between the two adjacent contour lines and merging the two adjacent contour lines into a single contour line.

9. The computer implemented method of claim 1, wherein the refining further includes:
    determining whether the refining causes two contour lines of the polygon contour to cross paths;
    if the two contour lines cross paths, then separating the polygon contour into two separate polygon contours at an intersection of the two contour lines;
    determining whether the refining cause a size of the polygon contour to drop below a threshold size; and
    if the polygon contour drops below the threshold size, terminating the polygon contour.

10. The computer implemented method of claim 1, further comprising:
    designating an initial region within the first frame of the image data, the initial region encompassing the object; and
    wrapping the initial region with the polygon contour prior to iteratively refining the polygon contour to more accurately trace the object.

11. The computer implemented method of claim 1, further comprising:
    seeding the polygon contour as an initial polygon contour within the object, wherein iteratively refining the polygon contour includes expanding the initial polygon contour outwards to trace a boundary of the object.

12. The computer implemented method of claim 1, wherein the polygon contour comprises a first polygon contour, the method further comprising:
    identifying a characteristic of the object to wrap;
    wrapping a boundary of an initial frame of the image data with a second polygon contour that wraps the initial frame excluding objects with the characteristic; and
    generating the first polygon contour as a child polygon contour of the second polygon contour upon detection of a contour line cross condition in the second polygon contour after the object enters the boundary in a subsequent frame of the image data.

13. The computer implemented method of claim 1, wherein the image data comprises a video sequence, the method further comprising tracking movement of the object between consecutive frames of the video sequence by:
    maintaining position information for the polygon contour across the consecutive frames of the video sequence; and
    iteratively re-refining the polygon contour for a given frame in the video sequence starting from a position identified by the position information carried over from a previous image frame.

14. The computing implemented method of claim 1, wherein the image energies associated with pixels touching the contour lines are ignored.

15. A computer-readable storage medium that provides instructions that, if executed by a machine, will cause the machine to perform operations comprising:
    generating a polygon contour for a first frame of an image sequence;
    iteratively refining contour lines of the polygon contour to more accurately trace the object within the first frame after each iteration, wherein the refining includes:
        computing image energies along lengths of the contour lines, wherein the computing the image energies along the lengths of the contour lines for a given contour line comprises:
            determining an evaluation region localized around the given contour line;
            assigning an object match condition to each pixel within the evaluation region; and
            assigning image energy values to the pixels within the evaluation region based on the object match condition assigned to each of the pixels; and
        adjusting positions of the contour lines based at least in part on the image energies; and
    updating the polygon contour for subsequent frames in the image sequence to track the object throughout the subsequent frames of the image sequence.

16. The computer-readable storage medium of claim 15, wherein adjusting the positions of the contour lines for the given contour line comprises:
    calculating pixel forces along the given contour line based on the energy values;
    calculating a moment on the given contour line due to the pixel forces; and
    calculating first and second normal forces acting on first and second ends of the given contour line, respectively, the first and second normal forces being equivalent to a sum of the pixel forces and the moment acting on the given contour line.

17. The computer-readable storage medium of claim 16, wherein adjusting the positions of the contour lines for the given contour line further comprises:

summing normal forces acting on a given line node from adjacent contour lines to determine a vector force for the given line node; and moving the given line node based at least in part on the vector force.

18. The computer-readable storage medium of claim 17, wherein moving the given line node based at least in part on the vector force further comprises moving the given line node based at least in part on the vector force and an assumed dampening field, wherein the movement is clamped by a dimension of the evaluation region.

19. The computer-readable storage medium of claim 15, wherein the refining further includes:
 determining a maximal breaking stress asserted on a given contour line;
 determining whether the maximal breaking stress exceeds a breaking threshold; and
 if the maximal breaking stress exceed the breaking threshold, then breaking the given contour line into two contour lines.

20. The computer-readable storage medium of claim 15, wherein the refining further includes:
 determining whether two adjacent contour lines are sufficiently co-linear within a threshold angle; and
 if the two adjacent contour lines are sufficiently co-linear, then removing a line node between the two adjacent contour lines and merging the two adjacent contour lines into a single contour line.

21. The computer-readable storage medium of claim 15, wherein the refining further includes:
 determining whether the refining causes two contour lines of the polygon contour to cross paths;
 if the two contour lines cross paths, then separating the polygon contour into two separate polygon contours at an intersection of the two contour lines;
 determining whether the refining cause a size of the polygon contour to drop below a threshold size; and
 if the polygon contour drops below the threshold size, terminating the polygon contour.

22. A computer vision system, comprising:
 an image source for capturing an image sequence; and
 a processing system coupled to the image source to receive the image sequence and to identify, to trace, and to track an object within the image sequence, the processing system including a computer-readable storage medium that provides instructions that, when executed by the processing system, cause the processing system to perform operations including:
  generating a polygon contour on a first frame of image data; and
  iteratively refining the polygon contour to more accurately trace an object within the first frame after each iteration, wherein the refining includes:
   computing image energies along lengths of contour lines of the polygon contour, wherein the computing the image energies along the lengths of the contour lines for a given contour line comprises:
    determining an evaluation region localized around the given contour line;
    assigning an object match condition to each pixel within the evaluation region; and
    assigning image energy values to the pixels within the evaluation region based on the object match condition assigned to each of the pixels; and
   adjusting positions of the contour lines based at least in part on the image energies.

23. The computer vision system of claim 22, wherein adjusting the positions of the contour lines for the given contour line comprises:
 calculating pixel forces along the given contour line based on the energy values;
 calculating a moment on the given contour line due to the pixel forces; and
 calculating first and second normal forces acting on first and second ends of the given contour line, respectively, the first and second normal forces being equivalent to a sum of the pixel forces and the moment acting on the given contour line.

24. The computer vision system of claim 23, wherein adjusting the positions of the contour lines for the given contour line further comprises:
 summing normal forces acting on a given line node from adjacent contour lines to determine a vector force for the given line node; and
 moving the given line node based at least in part on the vector force.

* * * * *